United States Patent
Tanaka et al.

(10) Patent No.: US 11,237,652 B2
(45) Date of Patent: Feb. 1, 2022

(54) ELECTRONIC PEN

(71) Applicant: Wacom Co., Ltd., Saitama (JP)

(72) Inventors: Kohei Tanaka, Saitama (JP); Kenichi Ninomiya, Saitama (JP); Ryuto Sakamoto, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/080,682

(22) Filed: Oct. 26, 2020

(65) Prior Publication Data

US 2021/0041964 A1     Feb. 11, 2021

Related U.S. Application Data

(63) Continuation of application No. PCT/JP2019/009886, filed on Mar. 12, 2019.

(30) Foreign Application Priority Data

May 25, 2018    (JP) .............................. JP2018-100233

(51) Int. Cl.
    *G06F 3/038*     (2013.01)
    *G06F 3/0354*     (2013.01)

(52) U.S. Cl.
    CPC ........ *G06F 3/0383* (2013.01); *G06F 3/03545* (2013.01)

(58) Field of Classification Search
    CPC .. G06F 3/0383; G06F 3/03545; G06F 3/0442; G06F 3/046
    See application file for complete search history.

(56) References Cited

U.S. PATENT DOCUMENTS

| | | | |
|---|---|---|---|
| 8,536,471 B2 * | 9/2013 | Stern | G06F 3/0442 178/19.04 |
| 10,379,642 B1 * | 8/2019 | Katsurahira | G06F 3/0383 |
| 10,379,670 B1 * | 8/2019 | Perez | G06F 3/0418 |
| 2014/0327657 A1 * | 11/2014 | Huang | G06F 3/03545 345/179 |
| 2016/0313812 A1 | 10/2016 | Katsurahira | |
| 2017/0102792 A1 * | 4/2017 | Aoki | G06F 3/0442 |
| 2018/0329526 A1 * | 11/2018 | Peretz | G06F 3/03545 |

FOREIGN PATENT DOCUMENTS

| | | |
|---|---|---|
| JP | 7-41633 U | 7/1995 |
| JP | 5761773 B1 | 8/2015 |

OTHER PUBLICATIONS

International Search Report, dated May 21, 2019, for International Application No. PCT/JP2019/009886, 1 page.

* cited by examiner

*Primary Examiner* — Bryan Earles
(74) *Attorney, Agent, or Firm* — Seed IP Law Group LLP

(57) ABSTRACT

An electronic pen includes an electrically conductive coil spring that expands and contracts, a core body having electrical conductivity, a writing pressure detector having a fitting part fitted to an end of the core body on a side of the core body that is opposite to a side of the core body that includes a pen tip, and an electronic circuit that includes an oscillating circuit. The electronic circuit, in operation, causes a detection result from the writing pressure detector to be included in a signal from the oscillating circuit. The core body penetrates through a center axis of the coil spring and is not biased by the coil spring, and a first end of the coil spring on a side of the coil spring adjacent to the pen tip is connected to the core body and a second end of the coil spring is connected to the electronic circuit.

5 Claims, 4 Drawing Sheets

ELECTRONIC PEN

BACKGROUND

Technical Field

The present disclosure relates to an electronic pen that implements functions as a position indicator for a position detecting device of the capacitive system.

Background Art

Position detecting devices are mounted in tablet devices and so forth that are input devices of personal computers. In the position detecting device, a position indication signal from the pen tip of an electronic pen is received and position indication to the position detecting device by the electronic pen is detected. In this case, a writing pressure detector that detects the pressure (writing pressure) applied to the pen tip is mounted in the electronic pen in order to properly discriminate the case in which the electronic pen is brought into contact with an operation surface of the position detecting device and input operation is being carried out (writing state). The electronic pen causes a detection result in this writing pressure detector to be included in the position indication signal and transmits the position indication signal to the position detecting device.

FIGS. 5A and 5B depict diagrams illustrating a configuration example of a related-art electronic pen of the capacitive system. As illustrated in FIG. 5A, the pen tip side of a casing 100 of the electronic pen is formed into a tapered shape. A pen tip part 101 is inserted into the inside of the casing 100 from this tapered tip and is attached to a pen tip shaft 103 through a connecting component 102. The pen tip part 101, the connecting component 102, and the pen tip shaft 103 are all formed of an electrically-conductive material. The end part of the pen tip shaft 103 on the opposite side to the pen tip side is inserted and attached into a fitting hole of a pressing component 1051 of a writing pressure detector 105.

The writing pressure detector 105 includes the pressing component 1051, a first electrode 1052, a dielectric 1053, and a second electrode 1054, and a gap is made between the first electrode 1052 and the dielectric 1053. Furthermore, the pen tip part 101 and the pen tip shaft 103 press the first electrode 1052 through the pressing component 1051 according to the writing pressure applied to the tip of the pen tip part 101, and the writing pressure can be detected according to the capacitance between the first electrode 1052 and the second electrode 1054 that changes according to this pressing.

A circuit board on which an electronic circuit is formed is disposed on the rear stage side of the writing pressure detector 105 (on the opposite side to the pen tip). This electronic circuit formed on the circuit board is what is formed through connecting electronic parts such as an oscillating circuit, a power supply circuit, and a capacitor. Furthermore, holding components 107, 108, 109, and so forth have a role in restriction, fixation, and so forth of the position in the casing 100 regarding various parts mounted in the casing 100.

Moreover, as illustrated in FIG. 5A and as illustrated also in FIG. 5B in a magnified manner, an electrically-conductive coil spring 104 is disposed around the part of the pen tip shaft 103 on the side of the writing pressure detector 105. Through the coil spring 104, a position indication signal including writing pressure information from the electronic circuit formed through connecting the oscillating circuit and so forth is supplied to the pen tip part 101 through the pen tip shaft 103 and the connecting component 102, and the position indication signal is transmitted from the pen tip of the pen tip part 101 toward the position detecting device. However, the coil spring 104 is not fixed directly to the pen tip shaft 103.

As described above, the pen tip part 101 and the pen tip shaft 103 frequently move in the axis center direction according to the writing pressure applied to the pen tip of the pen tip part 101. When merely the coil spring 104 is in contact with the pen tip shaft 103, there is concern that the coil spring 104 comes off the pen tip shaft 103 and contact failure occurs in association with such frequent movement. For this reason, the coil spring 104 is pressed against the pen tip shaft 103 that frequently moves in the axis center direction with a certain degree of pressure to thereby allow a sure electrical connection to be made. That is, a force by the coil spring 104 is applied to the pen tip shaft 103 originally.

On the other hand, the coil spring 104 is a small coil and therefore the spring constant as the coil involves variation. In writing pressure detection of the electronic pen, detection of subtle force adjustment like force adjustment regarding whether or not a pen tip gets contact with paper, for example, is required. In view of this, the reliability of the electronic pen is affected if there is variation in the force applied to the pen tip shaft 103 by the coil spring 104. Thus, Japanese Patent No. 5761773 (hereinafter, referred to as Patent Document 1) to be described later discloses an invention for detecting the writing pressure to allow use of the writing pressure rapidly and accurately and for enabling indication input by an electronic pen even when merely the pen tip of the pen tip part 101 slightly gets contact with an operation surface of a position detecting device.

Specifically, in the invention disclosed in Patent Document 1, evaporation or the like of an electrically-conductive substance on a polyimide film is carried out and an electronic circuit and a core body mounted in the electronic pen are always electrically connected by using it. In this case, the polyimide film protects the electrically-conductive substance evaporated thereon and allows keeping of the electrical connection between the electronic circuit and the core body. This makes it possible to properly keep the connection between the pen tip part that frequently moves in the axis center direction and the electronic circuit.

One of targets of the position detecting device and the electronic pen is to electronically reproduce a relation between existing paper and pencil. In the relation between paper and pencil, that a writing trace is left through mere contact of the pencil with the paper is also one important characteristic (function). For this reason, also in a relation between the position detecting device and the electronic pen, that the writing pressure applied to the pen tip of the electronic pen can be detected with high precision and the writing pressure can be notified to the position detecting device rapidly and accurately is an important issue.

Due to the invention disclosed in the above-described Patent Document 1, it becomes possible to always electrically connect the electronic circuit and the core body mounted in the electronic pen and detect the writing pressure rapidly and accurately. However, a problem in ensuring the contact between the polyimide film on which the electrically-conductive substance has been evaporated and the electrically-conductive core body also arises. For this reason, it is desired to allow the electronic circuit and the core body to be electrically connected as easily as possible and surely. Furthermore, for example, it is desired to allow information input enabling reproduction of the situation in which a slight writing trace is left through mere contact of a pencil with paper with higher precision also through the position detecting device with the electronic pen.

BRIEF SUMMARY

In view of the above, the present disclosure intends to implement an electronic pen that enables delicate information input like that carried out on paper with use of a pencil to be carried out to a position detecting device without making configurations and steps in manufacturing complicated.

In order to solve the above-described problem, the present disclosure implements an electronic pen of a capacitive system having a coil spring that is configured to expand and contract and has electrical conductivity, a core body having electrical conductivity, a writing pressure detector having a fitting part fitted to an end of the core body on a side of the core body that is opposite to a side of the core body that includes a pen tip, and an electronic circuit that includes an oscillating circuit, wherein the electronic circuit, in operation, causes a detection result from the writing pressure detector to be included in a signal from the oscillating circuit. The core body penetrates through a center axis part of the coil spring and is not biased by the coil spring, and a first end of the coil spring on a side of the coil spring adjacent to the pen tip is connected to the core body and a second end of the coil spring is connected to the electronic circuit.

According to this electronic pen, the core body is fitted to the fitting part of the writing pressure detector and transmits the writing pressure applied to the core body to the writing pressure detector, so that detection of the writing pressure is enabled. The detection result in the writing pressure detector is supplied to the electronic circuit and is caused to be included in the signal from the oscillating circuit and is output so as to be transmitted to the position detecting device. Furthermore, the core body penetrates through the center axis part of the coil spring, and the first end of this coil spring on the side of the coil spring adjacent to the pen tip is connected to the core body and the second end part is connected to the electronic circuit. The core body is disposed in such a manner as not to be biased by this coil spring in the state in which the core body is not used for writing.

That is, the core body is connected to the electronic circuit by the coil spring and the state in which the position indication signal can be sent out at any time is kept. Moreover, when even a slight writing pressure is applied to the core body disposed to penetrate through the center axis part of this coil spring, this coil spring contracts and the writing pressure is smoothly transmitted to the writing pressure detector. This can implement a high-precision electronic pen that can properly carry out the detection of the slight writing pressure and the transmission of the position indication signal including information that indicates the detected writing pressure according to operation by the user.

DETAILED DESCRIPTION

An electronic pen of a capacitive system according to an embodiment of the present disclosure will be described below with reference to the drawings.
[Configuration Example of Electronic Pen Pn]

Figure 1:
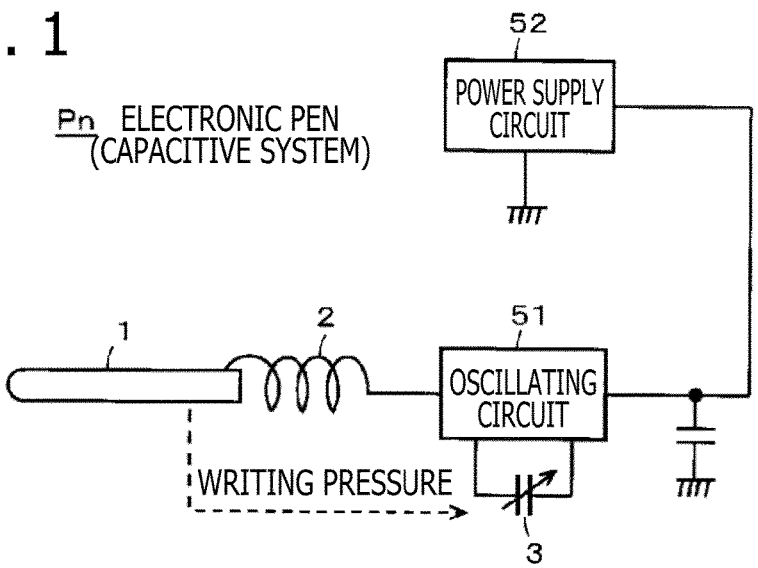
FIG. 1 is a block diagram for explaining a configuration example of an electronic pen of a capacitive system according to an embodiment of the present disclosure.

FIG. 1 is a block diagram for explaining a configuration example of an electronic pen Pn of the capacitive system according to the embodiment. In the casing of the electronic pen Pn, a circuit board on which an electronic circuit including various circuit parts such as an oscillating circuit 51, a power supply circuit 52, and a capacitor is formed is mounted. The oscillating circuit 51 is a circuit that generates a position indication signal transmitted from the electronic pen Pn. The power supply circuit 52 includes a power supply such as a primary battery or secondary battery, a circuit that forms driving power supplied to the respective parts from the power of this power supply, and so forth.

Furthermore, a writing pressure detector 3 that detects the writing pressure (value) applied to a core body 1 is disposed in the casing of the electronic pen Pn. The writing pressure detected by the writing pressure detector 3 is supplied to the electronic circuit including the oscillating circuit 51 and so forth and is caused to be included in the position indication signal from the oscillating circuit 51 and is output through processing such as modulation of the position indication signal by this writing pressure.

The core body 1 formed of an electrically-conductive material is connected to the electronic circuit having the oscillating circuit 51 and so forth through a coil spring 2. The coil spring 2 can expand and contract and has electrical conductivity. Due to this, the core body 1 is always electrically connected to the electronic circuit including the oscillating circuit 51 and so forth and can receive supply of the position indication signal from the electronic circuit at any time and transmit it.

The coil spring 2 has a natural length in the state in which the core body 1 and the electronic circuit are connected and in the state in which a writing pressure is not applied to the core body 1. Furthermore, the coil spring 2 immediately contracts even when only a slight writing pressure is applied to the core body 1, and can smoothly return to the original natural length when this writing pressure is removed. Moreover, the natural length of the coil spring 2 is a length that is sufficiently long compared with the coil spring that connects the electronic circuit and the core body used in the related-art electronic pen and allows mass production of coil springs of the same standard in which the spring constant is constant.

In general, if the coil spring has a high spring constant and has a high elastic modulus, a large force is necessary when it is contracted or expanded. For this reason, when the spring constant of the coil spring 2 is high, the elastic modulus also becomes high. This impedes the movement of the core body 1 to which the coil spring 2 is connected in the axis center direction, which precludes proper detection of the writing pressure. Furthermore, a high load is imposed on the connecting parts of the core body 1 and the electronic circuit to which the coil spring 2 is connected.

Thus, in the electronic pen Pn of this embodiment, as the coil spring 2, a coil spring is used that has a sufficiently low spring constant and therefore has also a low elastic modulus and contracts with a slight writing pressure and can rapidly return to the original state when this writing pressure is removed. Specifically, the coil spring 2 is a coil spring that can greatly contract immediately according to the writing pressure even with a slight writing pressure lower than 1 gram, for example.

Therefore, in the case of the electronic pen Pn of this embodiment, when a writing pressure is applied to the core body 1, the coil spring 2 does not impede pressing of the writing pressure detector 3 by the core body 1 and thus detection of a slight writing pressure is also enabled. Furthermore, both regarding the core body 1 to which the coil spring 2 is connected (fixed) and regarding the electronic circuit, a large force is not applied to the relevant connecting part. Moreover, variation in writing pressure detection of the electronic pen Pn due to variation in the coil spring 2 does not occur and it becomes possible to implement an electronic pen with high precision.

[Configuration Example of Position Detecting Device 200]

Figure 2:
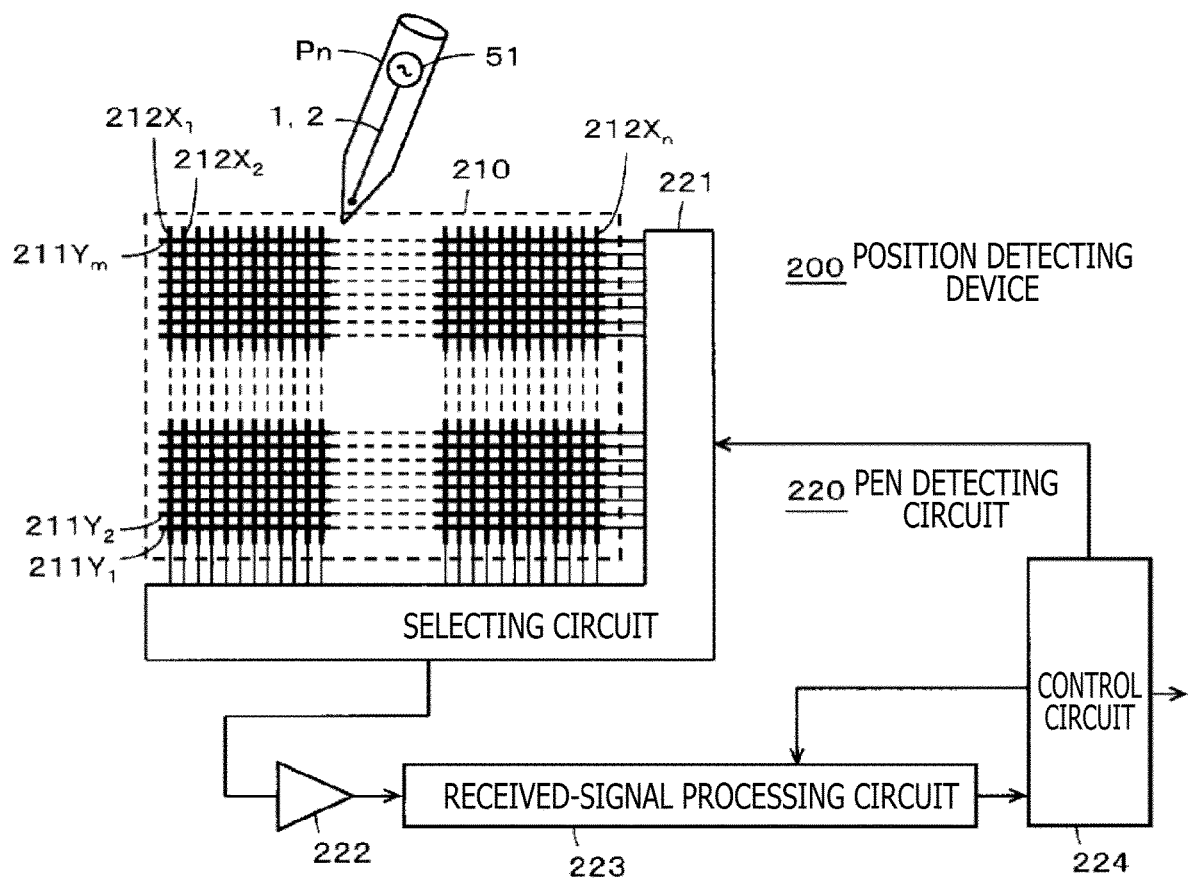
FIG. 2 is a block diagram for explaining a configuration example of a position detecting device of a capacitive system with which an electronic pen is used according to an embodiment of the present disclosure.

FIG. 2 is a block diagram for explaining a configuration example of a position detecting device 200 of the capacitive system with which the electronic pen Pn is used. As illustrated in FIG. 2, the position detecting device 200 includes a sensor 210 and a pen detecting circuit 220 connected to the sensor 210.

The sensor 210 is formed by stacking a first conductor group 211 and a second conductor group 212. The first conductor group 211 is a group in which plural first conductors $211Y_1$ to $211Y_m$ that extend in the horizontal direction (X-axis direction) are disposed in a Y-axis direction in parallel separately from each other by a predetermined interval, for example. Furthermore, the second conductor group 212 is a group in which plural second conductors $212X_1$ to $212X_n$ that extend in a direction that intersects the first conductors, in this example, the vertical direction (Y-axis direction) orthogonal to the first conductors, are disposed in the X-axis direction in parallel separately from each other by a predetermined interval.

As above, the sensor 210 of the position detecting device 200 has a configuration in which the position indicated by the electronic pen Pn of the capacitive system is detected by using the sensor pattern formed by making the first conductor group 211 and the second conductor group 212 intersect. In the description of FIG. 2, when one in the first conductors $211Y_1$ to $211Y_m$ is illustrated, this one is described as the first conductor 211Y. When one in the second conductors $212X_1$ to $212X_n$ is illustrated, this one is described as the second conductor 212X.

The pen detecting circuit 220 includes a selecting circuit 221 used as an input-output interface with the sensor 210, an amplifying circuit 222, a received-signal processing circuit 223, and a control circuit 224. Although not illustrated in the diagram, the received-signal processing circuit 223 includes a band-pass filter, a detection circuit, a sample-hold circuit, an analog to digital (AD) conversion circuit, and so forth.

The selecting circuit 221 selects one conductor 211Y or 212X from the first conductor group 211 and the second conductor group 212, based on a control signal from the control circuit 224. The conductor selected by the selecting circuit 221 is connected to the amplifying circuit 222 and a signal from the electronic pen Pn of the capacitive system is detected by the selected conductor and is amplified by the amplifying circuit 222. The output of the amplifying circuit 222 is supplied to the received-signal processing circuit 223. The received-signal processing circuit 223 subjects the signal supplied thereto to band limitation and detection processing. Thereafter, the received-signal processing circuit 223 samples and holds the signal and converts it to a digital signal to supply the digital signal to the control circuit 224.

The control circuit 224 supplies a control signal to the selecting circuit 221 and controls the selecting circuit 221, based on a program stored in an internal read only memory (ROM). In addition, the control circuit 224 supplies a control signal also to the received-signal processing circuit 223 and controls the received-signal processing circuit 223. Furthermore, from digital data from the received-signal processing circuit 223, the control circuit 224 calculates the position coordinates on the sensor 210 indicated by the electronic pen Pn and detects the writing pressure detected by the writing pressure detector 3 of the electronic pen Pn.

As above, the position detecting device 200 detects the indicated position and the writing pressure by the electronic pen Pn and supplies them to a computer device, for example, to allow implementation of displaying of a writing trace by the electronic pen Pn on a display screen, and so forth. Furthermore, the electronic pen Pn of this embodiment is a high-precision electronic pen that can properly detect even a slight writing pressure and cause the writing pressure to be included in a position indication signal to rapidly transmit the position indication signal to the position detecting device 200 as described above. This enables execution of delicate rendering input to the computer through the position detecting device 200 and displaying of delicate rendering on a display, for example, and so forth.

[Configuration Example of Inside of Electronic Pen Pn]

Figure 3A:
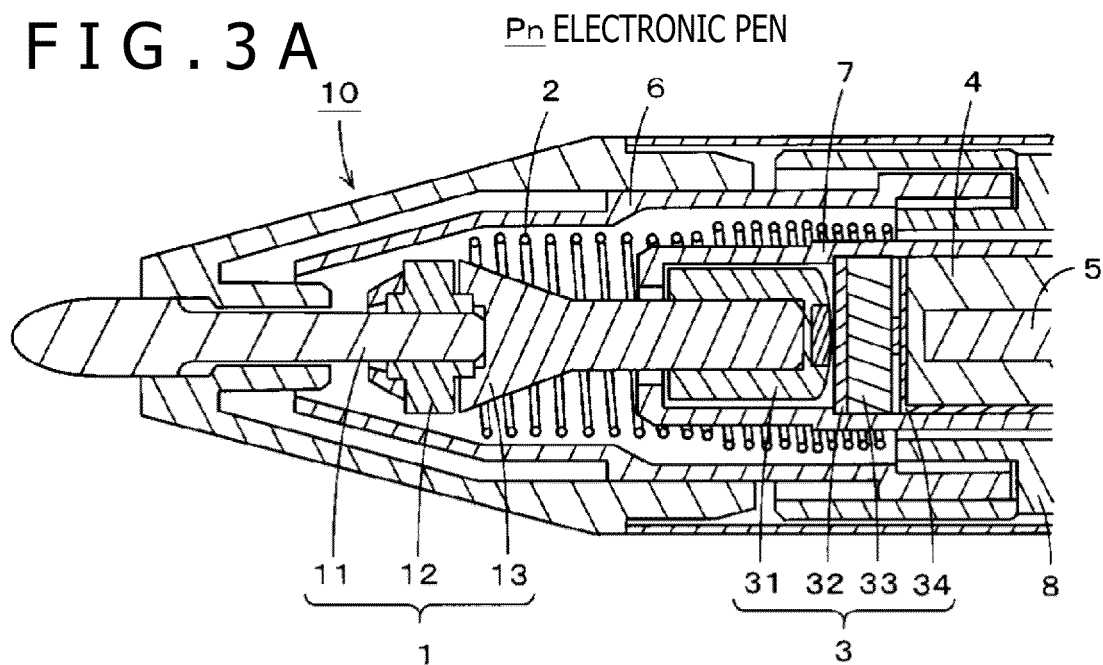
FIGS. 3A, 3B, and 3C depict diagrams for explaining an example of the electronic pen of the capacitive system according to the embodiment.
Figure 3B:
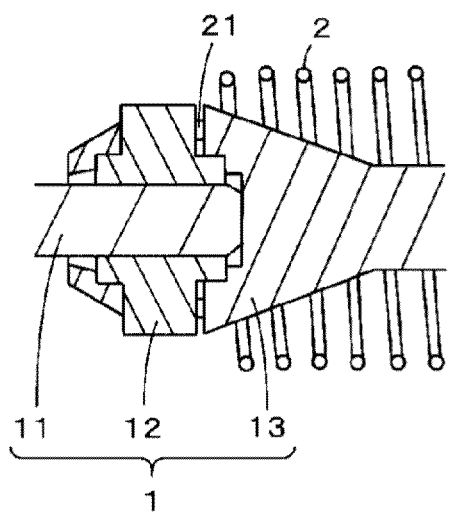
Figure 3C:
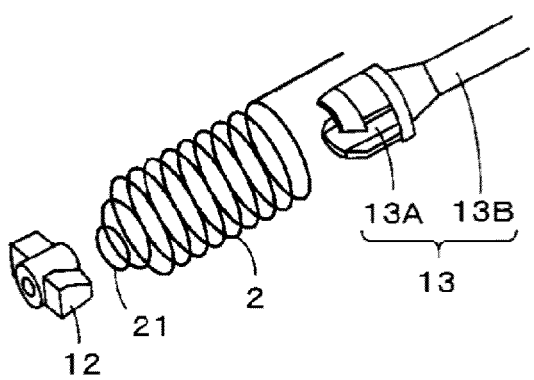

FIGS. 3A, 3B, and 3C depicts diagram for explaining a configuration example of the inside of the electronic pen Pn of the capacitive system according to an embodiment and is a diagram for explaining the main part of the pen tip side. As illustrated in a sectional view of the pen-tip-side part of the electronic pen Pn in FIG. 3A, the electronic pen Pn of this embodiment includes a casing 10 in which the pen tip side is tapered. A bar-shaped pen tip part 11 whose tip serves as a rounded pen tip is inserted into the inside of the casing 10 from the tip of the tapered casing 10. The end part of the pen tip part 11 on the opposite side to the pen tip side is connected to a shaft part 13 and is fixed by an electrically-conductive elastic component 12.

As above, in the electronic pen Pn of this embodiment, the pen tip part 11 and the shaft part 13 are connected in series through the electrically-conductive elastic component 12 and thereby the one bar-shaped core body 1 is configured. Furthermore, the pen tip part 11 and the shaft part 13 are both formed of a material having electrical conductivity. The pen tip part 11 and the shaft part 13 can be formed by various electrically-conductive materials such as a metal and a hard resin into which carbon powders are mixed, for example. Needless to say, it suffices that the pen tip part 11 and the shaft part 13 have electrical conductivity, and they may be each formed of a different material.

As above, the pen tip part 11 and the shaft part 13 both having electrical conductivity are connected through the electrically-conductive elastic component 12 and therefore the one continuous core body 1 having electrical conductivity as a whole can be configured. Furthermore, the electronic pen Pn has a configuration in which the pen tip part 11 is mounted to the electrically-conductive elastic component 12. The electrically-conductive elastic component 12 does not only have electrical conductivity but is also an elastic component and therefore attachment and detachment of the pen tip part 11 to and from it are enabled. This allows the pen tip part 11 to be replaced according to need.

Moreover, the end part of the shaft part 13 on the opposite side to the pen tip side is inserted into a fitting hole of a pressing component 31 of the writing pressure detector 3 and is attached to the writing pressure detector 3. The writing pressure detector 3 includes the pressing component 31, a first electrode 32, a dielectric 33, and a second electrode 34. Although not illustrated in FIG. 3A, a ring-shaped spacer is located between the first electrode 32 and the dielectric 33 and thereby a gap is made therebetween. When a writing pressure is applied to the tip (pen tip) of the pen tip part 11, the core body 1 including the pen tip part 11, the electrically-conductive elastic component 12, and the shaft part 13 is pushed in the axis center direction and presses the first electrode 32 through the pressing component 31.

Thereby, the first electrode 32 is pushed to move toward the side of the dielectric 33 and gets contact with the dielectric 33 to change a contact area thereof according to the pressing force. In this case, the capacitance between the first electrode 32 and the second electrode 34 changes according to a distance between the first electrode 32 and the dielectric 33 and the contact area between the first electrode 32 and the dielectric 33. The writing pressure applied to the core body 1 can be detected according to this change in the capacitance.

For this purpose, although not illustrated in FIG. 3A, an electrically-conductive line is extended from each of the first electrode and the second electrode of the writing pressure detector 3 and is connected to an electronic circuit formed on a circuit board 5 disposed on the opposite side to the pen tip side of the writing pressure detector 3. Due to this, in the electronic circuit formed on the circuit board 5, provision of a detection result from the writing pressure detector 3 can be received and the writing pressure can be identified. Furthermore, the writing pressure can be caused to be included in a position indication signal from the oscillating circuit 51 mounted in this electronic circuit and the position indication signal can be sent out.

A holding component 4 disposed in the casing 10 is a component that fixes the circuit board 5 in the casing 10. Furthermore, holding components 6, 7, 8, and so forth disposed in the casing 10 have a role in restriction, fixation, and so forth of the position in the casing 10 regarding various parts mounted in the casing 10.

Moreover, in the electronic pen Pn, the core body 1 and the electronic circuit on the circuit board 5 are always electrically connected by the coil spring 2 that can expand and contract and has electrical conductivity. FIG. 3B is an enlarged sectional view of a connecting part between the core body 1 and the coil spring 2. FIG. 3C is an exploded perspective view of components that configure this connecting part. As illustrated in FIG. 3A and FIG. 3B, the pen tip part 11 and the shaft part 13 are connected through the electrically-conductive elastic component 12.

As illustrated in FIG. 3C, the shaft part 13 includes a fitting part 13A to which the electrically-conductive elastic component 12 is fitted and a bar-shaped part 13B. To the fitting part 13A, the electrically-conductive elastic component 12 is fitted as illustrated in FIGS. 3A and 3B. When the electrically-conductive elastic component 12 is fitted to an appropriate position on the fitting part 13A, a protrusion that extends inward in the fitting part 13A engages with a part of the electrically-conductive elastic component 12 corresponding to this protrusion, so that the electrically-conductive elastic component 12 becomes incapable of being easily removed from the fitting part 13A.

Furthermore, when the electrically-conductive elastic component 12 is fitted to the fitting part 13A of the shaft part 13, as illustrated in FIG. 3B, a tip part 21 of the coil spring 2 on the pen tip side is located on the bottom surface side of the fitting part 13A. Then, by fitting the electrically-conductive elastic component 12 to the fitting part 13A, the tip part 21 of the coil spring 2 is clamped by the electrically-conductive elastic component 12 and the shaft part 13 and the coil spring 2 can electrically be connected and fixed to the fitting part 13A of the shaft part 13.

Specifically, as illustrated in FIG. 3C, the tip part 21 of the coil spring 2 on the pen tip side is a circular part with a short diameter compared with the part that extends in a spiral manner. Furthermore, as illustrated in FIG. 3C, the fitting part 13A of the shaft part 13 is made to penetrate through the center axis part of the coil spring 2 from the opposite side to the pen tip side of the coil spring 2 toward the pen tip side. In this case, the tip part 21 of the coil spring 2 is set to be located in the fitting part 13A of the shaft part 13. Thereafter, the electrically-conductive elastic component 12 is fitted to the fitting part 13A of the shaft part 13.

Due to this, as described with use of FIG. 3B, the coil spring 2 is clamped by the electrically-conductive elastic component 12 and the shaft part 13 and the coil spring 2 is connected to the core body 1, and this connecting state is allowed to be always kept. Furthermore, as illustrated in FIG. 3C, the end part of the coil spring 2 on the opposite side to the pen tip side is made to be a straight line manner and is extended to be electrically connected to the electronic circuit formed on the circuit board 5 as described with use of FIG. 1. Thereby, the core body 1 is always connected to the electronic circuit formed on the circuit board 5.

Moreover, a fitting hole with a diameter somewhat shorter than the diameter of the pen tip part 11 is made in the electrically-conductive elastic component 12 and the end part of the pen tip part 11 on the opposite side to the pen tip side is pushed into this fitting hole to mount the pen tip part 11. This can connect the coil spring 2 to the core body 1 including the pen tip part 11, the electrically-conductive elastic component 12, and the shaft part 13 and keep the connecting state.

Furthermore, the electronic circuit formed on the circuit board 5 is what is configured through connecting electronic parts such as the oscillating circuit 51, the power supply circuit 52, and a capacitor as described with use of FIG. 1. This electronic circuit and the core body 1 are always connected through the coil spring 2. This allows this electronic circuit to form a position indication signal including information on the writing pressure detected through the writing pressure detector 3 and supply the position indication signal to the core body 1 at any time.

Moreover, the core body 1 including the pen tip part 11, the electrically-conductive elastic component 12, and the shaft part 13 is disposed to penetrate through the center axis part of the coil spring 2 as illustrated in FIG. 3A. Furthermore, when the electronic pen Pn is not in the writing state, that is, in the state in which a writing pressure is not applied to the core body 1, the core body 1 is set in the casing 10 of the electronic pen Pn in the state in which the core body 1 is not biased by the coil spring 2.

In other words, the coil spring 2 has the natural length in the state in which the core body 1 and the electronic circuit on the circuit board 5 are connected and in the state in which a writing pressure is not applied to the core body 1 also as described above. The natural length of the coil spring 2 means the length when the coil spring 2 is not operated at all (is neither expanded nor contracted) and refers to the length in the natural state. However, the coil spring 2 is a coil spring that immediately contracts according to the writing pressure when even a slight writing pressure is applied to the core body 1 from the natural length state and can rapidly return to the original natural length when this writing pressure is removed.

That is, in the coil spring 2 of the electronic pen Pn, the spring constant is sufficiently low and therefore the elastic modulus is also low. Thus, the coil spring 2 contracts with a slight writing pressure and can rapidly return to the original state when this writing pressure is removed. For this reason, when even a slight writing pressure is applied to the pen tip of the pen tip part 11 configuring the core body 1, this writing pressure is immediately transmitted to the writing pressure detector 3 and the writing pressure value of this slight writing pressure can properly be detected.

Furthermore, because the electronic circuit of the circuit board 5 and the core body 1 are always electrically connected by the coil spring 2, the position indication signal including the immediately-detected writing pressure is supplied from the electronic circuit to the core body 1 and can be transmitted toward the position detecting device 200. That is, even when the pen tip of the pen tip part 11 only gets contact with the operation surface of the position detecting device 200 very slightly, the electronic pen Pn can transmit the position indication signal indicating the contact position thereof and the writing pressure toward the position detecting device 200. Thus, delicate indication input enabling reproduction of the situation in which a writing trace is left through mere slight contact of a pencil with paper can be carried out to the position detecting device 200. That is, high-precision rendering input is enabled.

Moreover, as is understood also from the above description, the summarization of the configuration of the electronic pen Pn of the embodiment is as follows. The electrically-conductive core body 1 of the electronic pen Pn penetrates through the center axis part of the coil spring 2. The tip part 21 of the coil spring 2 on the pen tip side is always connected to the core body 1 and the other end part is always connected to the electronic circuit formed on the circuit board 5. Furthermore, the end part of the core body 1 on the opposite side to the pen tip side is inserted into the fitting hole of the pressing component 31 of the writing pressure detector 3 and acts on the writing pressure detector 3.

Furthermore, the connecting part between the core body 1 and the coil spring 2 is as follows. The core body 1 includes the pen tip part 11, the electrically-conductive elastic component 12, and the shaft part 13 and the electrically-conductive elastic component 12 is fixed to the end part of the shaft part 13 on the pen tip side. In addition, the tip part 21 of the coil spring 2 on the pen tip side is clamped between the electrically-conductive elastic component 12 and the shaft part 13 and thereby is fixed in such a manner as to be always connected to the core body 1. The pen tip part 11 is gripped and fixed by the electrically-conductive elastic component 12 by being inserted into the fitting hole formed in the electrically-conductive elastic component 12. In addition, the other end part of the coil spring 2 is always connected to the electronic circuit formed on the circuit board 5.

Due to this, detection of a slight writing pressure can also be carried out properly as described above. Moreover, due to the constant connecting between the core body 1 and the electronic circuit formed on the circuit board 5, a high-precision electronic pen that can properly transmit the position indication signal including information that indicates the detected writing pressure to the position detecting device 200 can be implemented.

The coil spring 2 in the case of the electronic pen Pn described with use of FIGS. 3A, 3B, and 3C is a coil spring with a comparatively-long natural length that allows the shaft part 13 and the writing pressure detector 3 to be located at the center axis part of the coil spring from the vicinity of the boundary between the fitting part 13A and the bar-shaped part 13B of the shaft part 13. Due to having such a comparatively-long natural length, the coil spring 2 can absorb the load applied to the connecting parts of the core body 1 and the electronic circuit according to the writing pressure. Moreover, variation in writing pressure detection of the electronic pen Pn due to variation in the coil spring 2 does not occur and it becomes possible to implement an electronic pen with high precision.

Effects of Embodiment

In the electronic pen Pn of the above-described embodiment, the electronic circuit of the circuit board 5 and the core body 1 are always electrically connected by the coil spring 2. In this case, connecting between the coil spring 2 and the core body 1 can also be carried out surely and firmly. Thus, always the position indication signal including writing pressure information is supplied from the electronic circuit to the core body 1 and can be transmitted toward the position detecting device 200. Furthermore, the coil spring 2 is allowed to expand and contract in the natural length state, and the spring constant is low and therefore the elastic modulus is also low. For this reason, the coil spring 2 does not impede pressing of the writing pressure detector 3 by the core body 1 and therefore detection of a slight writing pressure is also possible.

Accordingly, in the case of the electronic pen Pn of this embodiment, even when the pen tip of the pen tip part 11 only gets contact with the operation surface of the position detecting device 200 very slightly, the position indication signal indicating the contact position thereof and the writing pressure can be transmitted toward the position detecting device 200. Thus, delicate indication input enabling reproduction of the situation in which a writing trace is left through mere slight contact of a pencil with paper can be carried out to the position detecting device 200.

Moreover, because the elastic modulus of the coil spring 2 is low, the coil spring 2 expands and contracts with a slight force. Therefore, both regarding the core body 1 to which the coil spring 2 is connected (fixed) and regarding the electronic circuit, a large force is not applied to the relevant connecting part. Due to this, variation in writing pressure detection of the electronic pen due to variation in the coil spring does not occur and it becomes possible to implement an electronic pen with high precision. That is, an electronic pen that can carry out high-precision rendering input and has high reliability can be implemented.

Modification Example 1

In the electronic pen Pn of the above-described embodiment, as described with use of FIG. 3, the electrically-conductive elastic component 12 is mounted to the fitting part 13A formed at the end part of the shaft part 13 on the pen tip side. The tip part 21 of the coil spring 2 is clamped and fixed by the electrically-conductive elastic component 12 and the shaft part 13. In addition, the pen tip part 11 is inserted into the fitting hole of the electrically-conductive elastic component 12 and the pen tip part 11 is coupled to the shaft part 13. However, it is also possible to employ a configuration in which the electrically-conductive elastic component 12 is not used.

Specifically, a protrusion for gripping the pen tip part 11 is disposed inside the fitting part 13A formed at the tip part of the shaft part 13 on the pen tip side. The protrusion can be disposed in a ring manner along the inner wall inside the fitting part 13A. Furthermore, one or more protrusions can be disposed on the inner wall inside the fitting part 13A. The end part of the pen tip part 11 on the opposite side to the pen tip side is inserted and fixed into the fitting part 13A of the shaft part 13.

Moreover, it suffices that the tip part 21 of the coil spring 2 is located near the inside bottom surface of the fitting part 13A of the shaft part 13 in such a manner as not to be shifted. Due to this, when the pen tip part 11 is inserted and fitted into the fitting part 13A of the shaft part 13, the tip part 21 of the coil spring 2 can be clamped by the pen tip part 11 and the shaft part 13 and can be connected and fixed to the core body 1. This can configure an electronic pen with the configuration in which the electrically-conductive elastic component 12 is not used.

The tip part 21 of the coil spring 2 may be fixed through being bonded to the bottom surface part of the fitting part of the shaft part 13 by an adhesive, for example, or may be fixed through being sandwiched into a notch made in the bottom surface part of the fitting part 13A. Various methods can be used for the connecting and fixing of the tip part 21 of the coil spring 2 to the shaft part 13.

Modification Example 2

Figure 4:
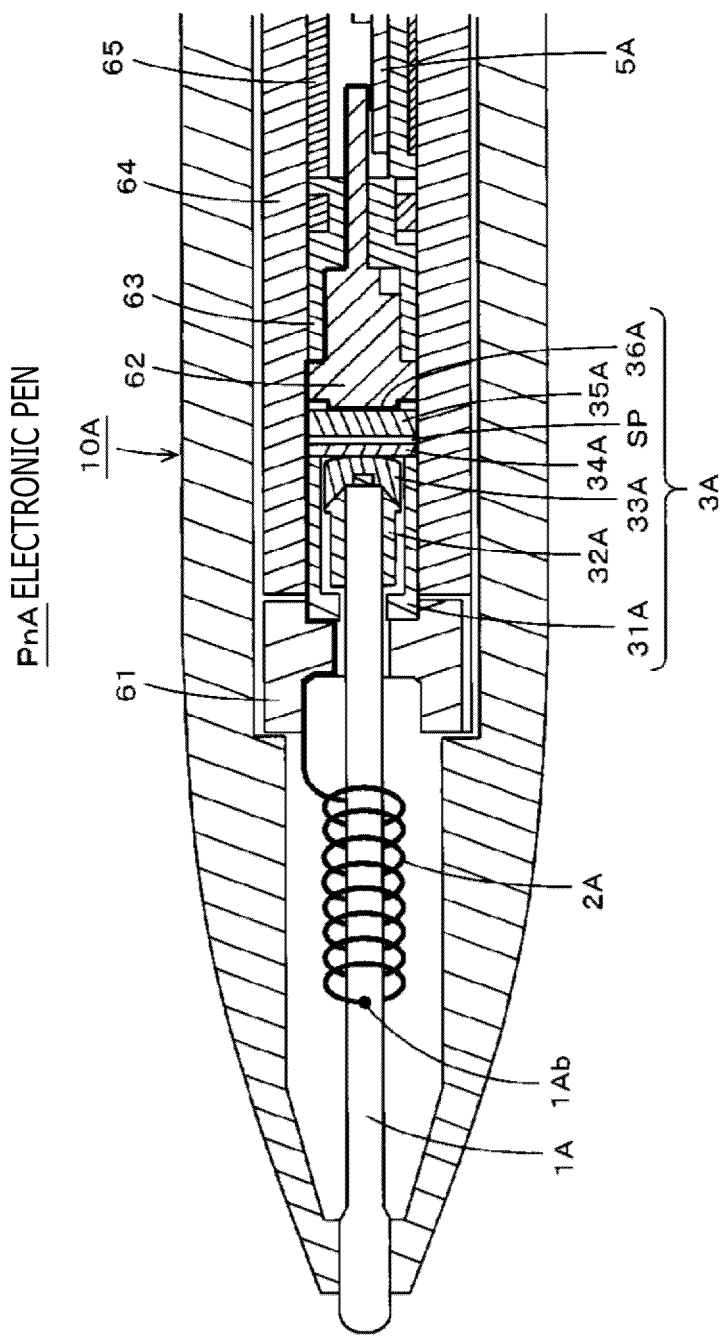
FIG. 4 is a diagram for explaining another example of the electronic pen of the capacitive system according to an embodiment of the present disclosure.
Figure 5A:
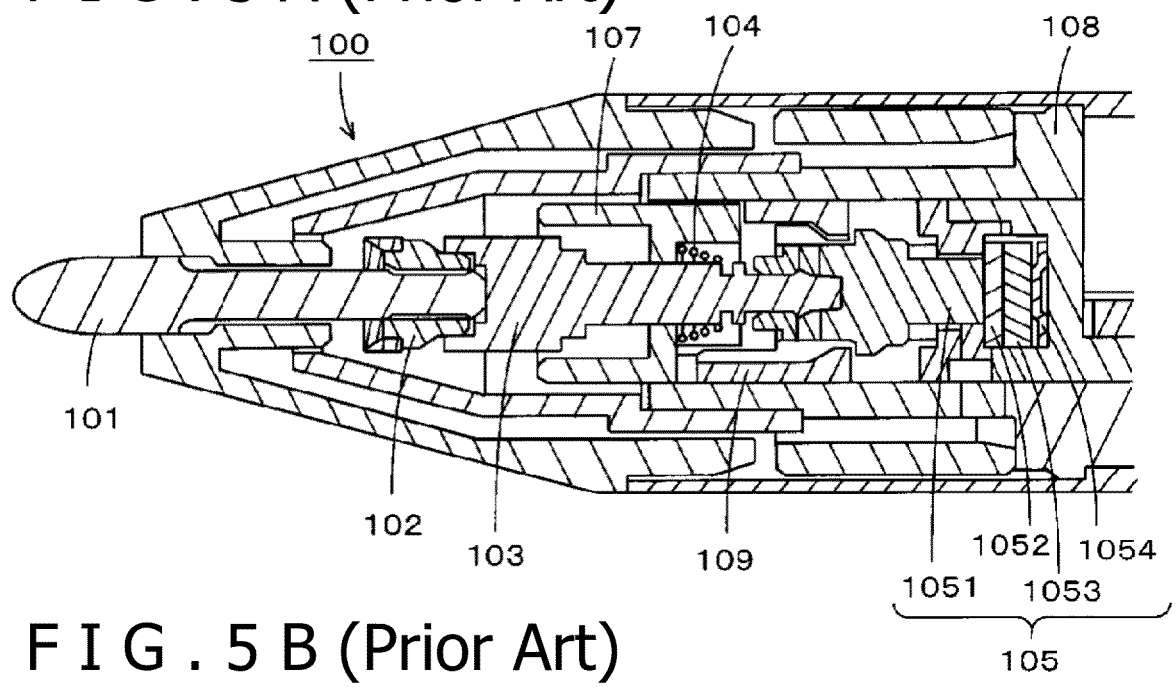
FIGS. 5A and 5B depict diagrams illustrating a configuration example of a related-art electronic pen of the capacitive system.
Figure 5B:
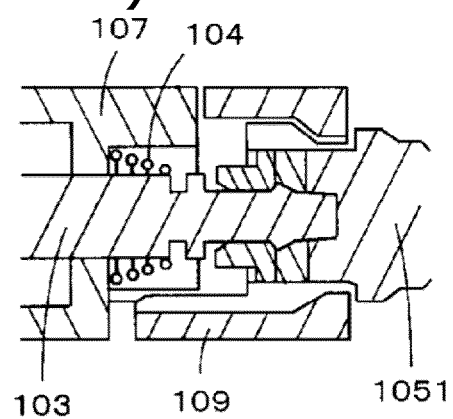

FIG. 4 is a sectional view for explaining another configuration example of the inside of the electronic pen of the capacitive system. However, in FIG. 4, regarding a core body 1A and a coil spring 2A, not a section but the whole thereof is illustrated. In the electronic pen Pn described above with use of FIG. 3, the core body 1 includes the pen tip part 11, the electrically-conductive elastic component 12, and the shaft part 13. In contrast, the core body 1A of an electronic pen PnA of this example is configured as a single core body.

Furthermore, as illustrated in FIG. 4, a casing 10A of the electronic pen PnA of this example also has a tapered tip and the tip part (pen tip) of the core body 1A is made to protrude from the tapered tip. The end part of the core body 1A on the opposite side to the pen tip side is inserted into a fitting hole of a holding component 32A of a writing pressure detector 3A and can transmit the writing pressure to the writing pressure detector 3A.

The writing pressure detector 3A of the electronic pen PnA of this example has a configuration similar to that of the writing pressure detector 3 of the electronic pen Pn described with use of FIGS. 3A, 3B, and 3C although difference in details exists. Specifically, in the writing pressure detector 3A, the holding component 32A of the core body 1A and a pressing component 33A continuous with the holding component 32A are disposed in a holder 31A. A pressing part that can move in the axis center direction in association with the core body 1A includes the holding component 32A and the pressing component 33A.

A first electrode 34A is disposed on the opposite side to the pen tip side across the holder 31A and a dielectric 35A is disposed with the intermediary of a slight gap SP. A second electrode 36A is disposed on the surface of the dielectric 35A on the opposite side to the side of the first electrode 34A. As above, the pressing part including the holding component 32A and the pressing component 33A, the first electrode 34A, the gap SP, the dielectric 35A, and the second electrode 36A are disposed, so that the writing pressure detector 3A is configured.

The writing pressure detector 3A is capable of detecting the writing pressure applied to the core body 1A similarly to the writing pressure detector 3 of the electronic pen Pn described with use of FIG. 3. Furthermore, holding components 61, 62, 63, 64, 65, and so forth have a role in restriction, fixation, and so forth of the position in the casing 10A regarding various parts mounted in the casing 10A.

Furthermore, also in the case of the electronic pen PnA of this example, a circuit board 5A on which an electronic circuit configured through connecting the oscillating circuit 51, the power supply circuit 52, a capacitor, and so forth is formed is disposed at the rear stage of the writing pressure detector 3A. To the electronic circuit formed on the circuit board 5A, as illustrated in FIG. 4, the first electrode 34A and the second electrode 36A of the writing pressure detector 3A are connected and a coil spring 2A that can expand and contract and has electrical conductivity is connected. The end part of the coil spring 2A on the pen tip side is connected and fixed to the core body 1A at a connecting part 1Ab of the core body 1A as illustrated in FIG. 4.

This causes the core body 1A and the electronic circuit on the circuit board 5A to be in the state of being always connected. Furthermore, the first electrode 34A and the second electrode 36A of the writing pressure detector 3A are also in the state of being always connected to the electronic circuit on the circuit board 5A. Moreover, similarly to the coil spring 2 of the electronic pen Pn of the above-described embodiment, the coil spring 2A is allowed to expand and contract in the natural length state, and the spring constant is sufficiently low and therefore the elastic modulus is also low. Thus, the coil spring 2A contracts with a slight writing pressure and can rapidly return to the original state when this writing pressure is removed.

Therefore, also in the case of the electronic pen PnA of this example, when a writing pressure is applied to the core body 1A, the coil spring 2A does not impede pressing of the writing pressure detector 3A by the core body 1A. Furthermore, both regarding the core body 1A to which the coil spring 2A is connected (fixed) and regarding the electronic circuit, a large force is not applied to the relevant connecting part. Moreover, variation in writing pressure detection of the electronic pen due to variation in the coil spring does not occur and it becomes possible to implement an electronic pen with high precision.

Due to this, also in the case of the electronic pen PnA of this example, detection of a slight writing pressure can also be carried out properly. Furthermore, due to the constant connecting between the core body 1A and the electronic circuit formed on the circuit board 5A, the high-precision electronic pen PnA that can properly transmit the position indication signal including information that indicates the writing pressure to the position detecting device 200 can be implemented. In the case of the electronic pen PnA of this example, it is impossible to replace the core body 1A by insertion-withdrawal operation. However, it is possible that the main part of the electronic pen PnA is taken out from the inside of the casing 10A and the user carries out replacement work, obviously.

Furthermore, in the case of the electronic pen Pn described with use of FIG. 3, the number of turns and the natural length of the coil spring 2 can be set to appropriate values. Similarly, the number of turns and the natural length of the coil spring 2A of the electronic pen PnA described with use of FIG. 4 can be set to appropriate values. The point is that it suffices that the number of turns and the natural length with which transmission of the writing pressure is impeded are not employed.

Moreover, both regarding the coil spring 2 of the electronic pen Pn and regarding the coil spring 2A of the electronic pen PnA, it suffices that the spring constant and the elastic modulus are set to values that do not inhibit the movement of the core bodies 1 and 1A to which they are connected according to the writing pressure and do not impose a load on the connecting parts.

It is to be noted that the embodiments of the present disclosure are not limited to the foregoing embodiment, and that various changes can be made without departing from the spirit of the present disclosure.

What is claimed is:

1. An electronic pen of a capacitive system, comprising:
a coil spring that is configured to expand and contract, and has electrical conductivity;
a core body having electrical conductivity;
a writing pressure detector having a fitting part fitted to an end of the core body on a side of the core body that is opposite to a side of the core body that includes a pen tip; and
an electronic circuit that includes an oscillating circuit, wherein the electronic circuit, in operation, causes a detection result from the writing pressure detector to be included in a signal from the oscillating circuit,
wherein:
the core body penetrates through a center axis of the coil spring,
in a state in which a writing pressure is not applied to the core body, the core body is not biased by the coil spring,
a first end of the coil spring on a side of the coil spring adjacent to the pen tip is connected to the core body, and
a second end of the coil spring is connected to the electronic circuit.

2. The electronic pen according to claim 1, wherein:
the core body includes a pen tip part including the pen tip, and a shaft part,
an end of the shaft part on a side of the shaft part adjacent to the pen tip part has a fitting part to which an end of the pen tip part on a side of the pen tip part opposite to a side of the pen tip part including the pen tip is fitted, and
the first end of the coil spring on the side of the coil spring adjacent to the pen tip is clamped between the pen tip part and the shaft part at the fitting part of the shaft part.

3. The electronic pen according to claim 1, wherein:
the core body includes a pen tip part including the pen tip, a shaft part, and an electrically-conductive elastic component,
the electrically-conductive elastic component is fixed to an end of the shaft part on a side of the shaft part adjacent to the pen tip part,
the first end of the coil spring on the side of the coil spring adjacent to the pen tip is clamped between the electrically-conductive elastic component and the shaft part, and
the pen tip part is gripped by the electrically-conductive elastic component.

4. The electronic pen according to claim 1, wherein:
the coil spring is connected to the core body and the electronic circuit in a state in which the coil spring has a natural length,
the coil spring has the natural length while the coil spring is not expanded or contracted, and
the coil spring, in operation, contracts when a writing pressure is applied to the core body and returns to the natural length upon release of the writing pressure.

5. The electronic pen according to claim 1, wherein:
a spring constant of the coil spring enables expansion and contraction of the coil spring in response to a force smaller than 1 gram.

* * * * *